United States Patent [19]

Ackerman et al.

[11] Patent Number: 4,571,713
[45] Date of Patent: Feb. 18, 1986

[54] DIGITAL DATA RECORD

[75] Inventors: Richard Ackerman; Donovan H. Hurlbut; Alan A. Jewer, all of Whitewater, Wis.

[73] Assignee: News Log International, Inc., Janesville, Wis.

[21] Appl. No.: 625,573

[22] Filed: Jun. 28, 1984

Related U.S. Application Data

[63] Continuation of Ser. No. 290,475, Aug. 6, 1981, abandoned, which is a continuation-in-part of Ser. No. 181,172, Aug. 25, 1980, abandoned.

[51] Int. Cl.$^4$ .............................................. G11B 7/00
[52] U.S. Cl. ...................................................... 369/44
[58] Field of Search ......................................... 369/44

[56] References Cited

U.S. PATENT DOCUMENTS

| | | | |
|---|---|---|---|
| 3,186,707 | 6/1965 | Banning, Jr. et al. | 274/41.4 |
| 3,198,527 | 8/1965 | Stanton | 274/11 |
| 3,404,224 | 10/1968 | Revelo et al. | 358/128.5 |
| 3,501,586 | 3/1970 | Russell | 178/6.7 |
| 3,543,007 | 11/1970 | Brinker et al. | 235/61.11 |
| 3,549,826 | 12/1970 | Browning | 179/100.3 |
| 3,624,284 | 11/1971 | Russell | 178/6.7 |
| 3,675,930 | 7/1972 | Summerfield | 274/11 R |
| 3,795,902 | 3/1974 | Russell | 340/173 |
| 3,806,643 | 4/1974 | Russell | 178/6.7 |
| 3,885,094 | 5/1975 | Russell | 178/7.6 |
| 3,898,629 | 8/1975 | Wsterberg | 178/6.7 |
| 3,919,697 | 11/1975 | Walker | 340/173 |
| 3,931,457 | 1/1976 | Mes | 358/128.5 |
| 3,939,302 | 2/1976 | Kihara | 358/130 |
| 3,961,315 | 6/1976 | Yokoyama | 340/173 LM |
| 4,034,210 | 7/1977 | Hill | 53/266 A |
| 4,090,031 | 5/1978 | Russell | 358/130 |
| 4,102,569 | 7/1978 | Schwartz | 353/120 |
| 4,163,600 | 8/1979 | Russell | 350/6.7 |
| 4,213,040 | 7/1980 | Gokey et al. | 235/476 |
| 4,254,329 | 3/1981 | Gokey et al. | 235/379 |
| 4,308,455 | 12/1981 | Bullis | 235/463 |
| 4,353,077 | 10/1982 | Gokey | 235/463 |
| 4,410,877 | 10/1983 | Carasso et al. | 340/347 DD |
| 4,416,001 | 11/1983 | Ackerman | 369/44 |

*Primary Examiner*—Harold I. Pitts
*Attorney, Agent, or Firm*—Thomas R. Vigil

[57] ABSTRACT

An information record has a body of photographic film, paper, plastics material or the like, in which digital information is carried on a body in equal-radii, arcuate rows which extend across the body. The information may be stored as dark spots, light spots or dark-to-light or light-to-dark transitions with respect to transparent substances and in reflective areas, non-reflective areas or reflective-to-non-reflective or non-reflective-to-reflective transitions.

15 Claims, 1 Drawing Figure

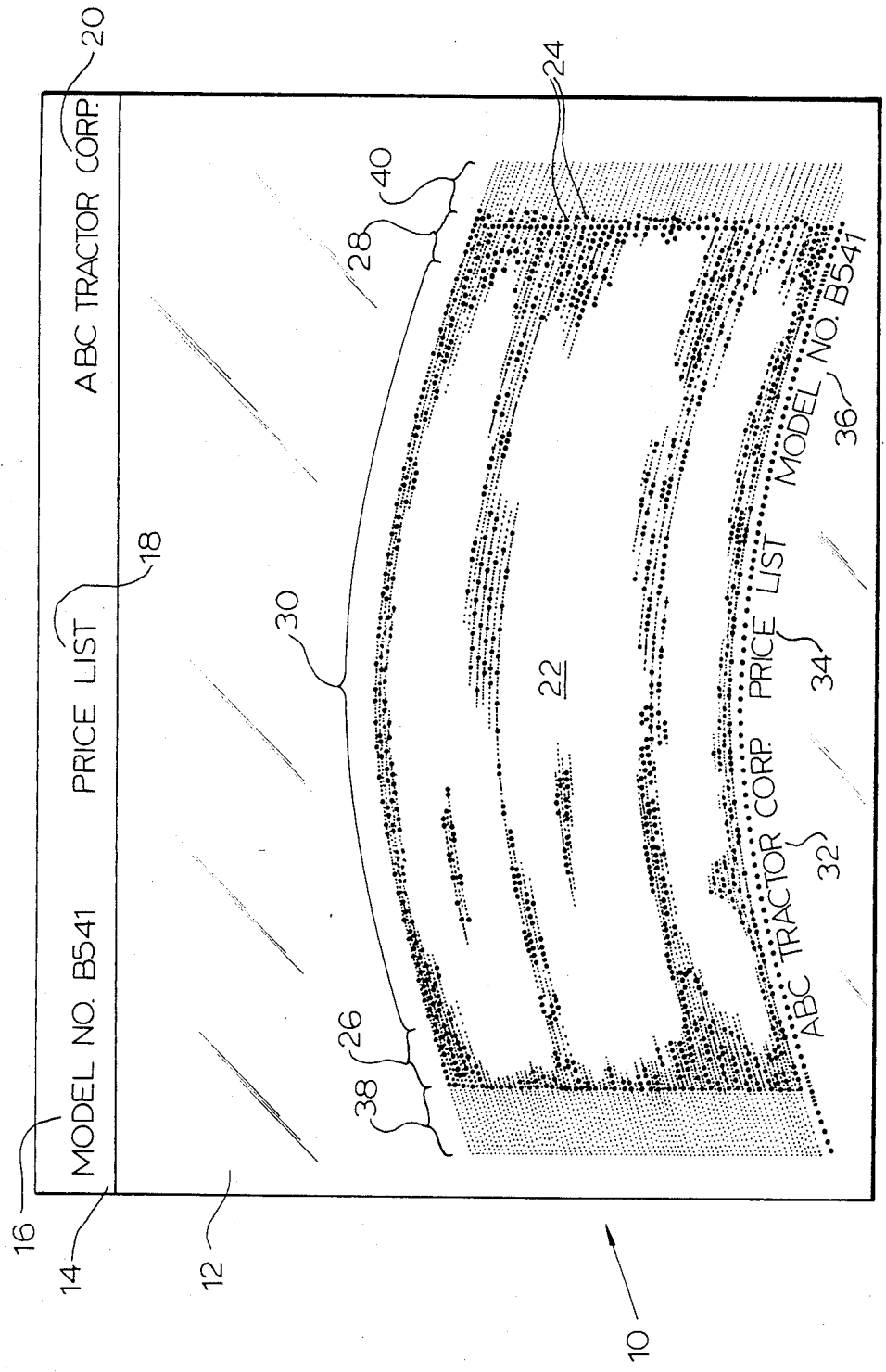

DIGITAL DATA RECORD

CROSS REFERENCE TO RELATED ART AND APPLICATIONS

This application is related to Gokey et al U.S. Pat. No. 4,213,040, issued July 15, 1980, Gokey et al Ser. No. 956,246, filed Oct. 31, 1978, now U.S. Pat. No. 4,254,329, issued Mar. 3, 1981, and Gokey et al, Ser. No. 74,095, filed Sept. 10, 1979, and issued to U.S. Pat. No. 4,353,077, on Oct. 5, 1982, and is a continuation of U.S. application Ser. No. 290,475, filed Aug. 6, 1981, now abandoned, which is a continuation-in-part of our earlier U.S. application Ser. No. 181,172 filed Aug. 25, 1980, now abandoned.

BACKGROUND OF THE INVENTION

1. Field of the Invention

The present invention relates to an information record in which digital information is stored on a body, and more particularly to such an information record in which the digital information is stored on a body in rows, spaced-apart, to one another, the rows extending in an arcuate manner across the body and having the same radius and arranged in a nested manner.

2. Description of the Prior Art

Gokey et al U.S. Pat. No. 4,213,040, mentioned above, discloses the provision of digital information in rows and columns on a record carrier, in which access and reading is performed with an X-Y transport adapted for skew correction. The same type of storage is disclosed in Gokey et al. Ser. No. 956,426, also mentioned above.

In Gokey et al Ser. No. 74,095, the information record takes the form of a disc in which the rows of information are disposed as straight radial lines, arcuate radial lines or circles with respect to the axis of rotation of the disc.

SUMMARY OF THE INVENTION

The object of the present invention is to provide an information record which has the advantages of the rectangular records of the two first-mentioned references and the advantages of the latter reference, without the disadvantages associated with either.

As to advantages, the information is stored in arcs and the apparatus for recording, and reading should easily be accommodated with respect to rotational and the like. Also, the advantages of a continuously moving disc should be exploited in order to avoid the requirements of a start-stop operation.

With the above in mind, the present invention provides an information record in which the digital information is stored on a body of material, such as photographic film, paper, various plastics material and the like, in spaced-apart, equal-radii, internested arcs. By so doing, both writing and reading of information takes advantage of a continuously moving system, and registration with respect to skew, radius and the like are readily accommodated.

The information itself may be in the form of dark-on-light, light-on-dark, reflective-on-non-reflective, non-reflective-on-reflective or preferably, transitions between the different transmission or reflection characteristics.

BRIEF DESCRIPTION OF THE DRAWING

Other objects, features and advantages of the invention, its organization, construction and operation will be best understood from the following description, taken in conjunction with the accompanying drawing, on which there is a single FIGURE which illustrates a plan view of an information record constructed in accordance with the present invention.

DESCRIPTION OF THE PREFERRED EMBODIMENTS

Referring to the drawing, an information record is generally illustrated at 10 as comprising a body 12 which may have a header 14 affixed thereto. The header 14 may include visually perceptible information, as illustrated at 16, 18 and 20, dealing with, for example, the price list relating to a particular model number manufactured by a particular manufacturing organization.

The digital information relating to each element which may be a part of a price list, for example, is recorded in a plurality of spaced-apart arcuate rows or tracks, hereinafter "rows", of information 24 in an area 22 of the body 12. Although the rows 24 may appear parallel on the drawing, they are not parallel. The data record 10 is to be incrementally indexed along a radial line; therefore, each row 24 has the same radius as the next, so that the rows are recorded in a nested arrangement.

An operating program may tell a machine the address of a row with respect to distance from a datum line, so that the machine itself will respond accordingly to access the proper row, and each row may include a row address at either or both ends, as referenced at 26 and 28, with the digital information to be obtained located therebetween, such as at 30. The address information 26, 28 may also be interspersed along the respective line, assuming that the hardware and software is set up to read in such a manner.

The record medium may be in the form of paper, plastics or the like, or may be a photographic film in which the background may be transparent or dark and the individual information dots may be of the opposite character. The dots themselves may contain the digital information such that a dark dot on a light or transparent background may be considered a "1" or such that a light dot on a dark background may represent a "1". Preferably, however, and notwithstanding the transparency of the background, the information is contained in the opaque-to-transparent and transparent-to-opaque transitions.

The above discussion with respect to transparency and opaqueness of a medium, for example a photographic film, is not limiting with respect to the present invention. The information may be stored with respect to reflective elements carried by the body, whether the body is transparent or opaque. Again, the information may be stored as a result of the reflective material being present or absent, or may be stored with respect to the transitions between the reflective and non-reflective areas.

The camera for producing such a record also has the capability of providing, in place of or in addition to the information 16, 18 and 20 carried on a header 14, the same or additional information on the film, as indicated at 32, 34 and 36, in the same manner as recording of the digital information. Such information may be graphic and/or digital, where graphic means all types of information, including alphanumeric, drawings, symbols and the like.

The record may also comprise leader (trailer) indicia 38, 40 which informs the reading device of the beginning and ending of digital information.

As media, and depending on whether one is speaking of an original or a reproduction (dupe), various materials may be employed, such as paper, coated enamel paper, plastic filament paper, Mylar, Kodalith Pan, Dry Silver, Tri-X, Plus X, Diazo and Vesicular materials and the like.

Although we have described our invention by reference to particular embodiments, many changes and modifications thereof may become apparent to those skilled in the art without departing from the spirit and scope of the invention. We therefore intend to include within the patent warranted hereon all such changes and modifications as may reasonably and properly be included within the scope of our contribution to the art.

We claim:

1. An information record comprising: a generally flat body; and digital information carried on said body in arcuate rows, said rows of digital information having the same radius and being disposed in a spaced-apart nested arrangement along a common center line extending transversely of said rows.

2. An information record comprising: a generally flat body; and digital information carried on said body in arcuate rows, said rows of digital information having the same radius and being disposed in a spaced-apart nested arrangement along a common center line extending transversely of said rows, and said generally flat body being a photographic film and said digital information comprising transparent portions of the film.

3. An information record comprising: a generally flat body; and digital information carried on said body in arcuate rows, said rows of digital information having the same radius and being disposed in a spaced-apart nested arrangement along a common center line extending transversely of said rows, and said generally flat body being a photographic film and said digital information comprising opaque portions of the film.

4. An information record comprising: a generally flat body; and digital information carried on said body in arcuate rows, said rows of digital information having the same radius and being disposed in a spaced-apart nested arrangement along a common center line extending transversely of said rows, and said generally flat body being a photographic film and said digital information comprising opaque-to-transparent and transparent-to-opaque transitions of the film.

5. An information record comprising: a generally flat body; and digital information carried on said body in arcuate rows, said rows of digital information having the same radius and being disposed in a spaced-apart nested arrangement along a common center line extending transversely of said rows, and said generally flat body being substantially opaque, and said digital information comprising reflective areas on said body.

6. An information record comprising: a generally flat body; and digital information carried on said body in arcuate rows, said rows of digital information having the same radius and being disposed in a spaced-apart nested arrangement along a common center line extending transversely of said rows, and said generally flat body being substantially reflective and comprising non-reflective areas on said body to provide reflective-to-nonreflective transitions representing the digital information.

7. An information record comprising: a generally flat body; and digital information carried on said body in arcuate rows, said rows of digital information having the same radius and being disposed in a spaced apart nested arrangement along a common center line extending transversely of said rows, and said generally flat body being substantially non-reflective and comprising reflective areas on said body to provide non-reflective-to-reflective transitions representing the digital information.

8. An information record comprising: a generally flat body of photographic film; and a plurality of arcuate rows of digital information borne by said body, said digital information comprising transitions between opaque and transparent areas and said rows being spaced and nested and having equal radii and being arranged along a common center line extending transversely of said rows.

9. An information carrier comprising: a generally flat body of substantially non-reflective material, and reflective areas carried by said body in equal radii, arcuate, nested rows, said rows being arranged along a common center line extending transversely of said rows, and constituting at the transitions between reflective and non-reflective areas, digital information.

10. An information carrier comprising: a generally flat body of substantially reflective material, and non-reflective areas carried by said body in equal radii, arcuate, nested rows, said rows being disposed along a common center line extending transversely of said rows, and constituting at the transitions between reflective and non-reflective areas, digital information.

11. An information record comprising: a generally flat carrier of a material having a first light transmissive characteristic; rows of marks carried on said carrier, said rows being spaced apart and each of said rows extending in an arcuate manner and having the same radius as the other rows, said rows being disposed along a common center line extending transversely of said rows; and each of said marks having a second light transmissive characteristic which is different from said first light transmissive characteristic to therewith define digital data.

12. The information record of claim 11, wherein: said first light transmissive characteristic is greater than that of said second light transmissive characteristic, the differences defining the digital data.

13. The information record of claim 11, wherein: said second light transmissive characteristic is greater than that of said first light transmissive characteristic, the difference defining the digital data.

14. The information record of claim 11, wherein: the transitions between the first and second light transmissive characteristics of said carrier and marks constitutes the digital data.

15. The information record of claim 11, and further comprising:
a header along one edge of the carrier, said header bearing visually perceptible information related to the digital data of said rows of marks.

* * * * *